March 17, 1959   N. S. GRIGGS   2,877,601
SAP COLLECTION SYSTEM
Filed Feb. 28, 1956

INVENTOR
NELSON S. GRIGGS
BY
ATTORNEYS

United States Patent Office 2,877,601
Patented Mar. 17, 1959

2,877,601

SAP COLLECTION SYSTEM

Nelson Stevens Griggs, Montpelier, Vt.

Application February 28, 1956, Serial No. 568,339

12 Claims. (Cl. 47—52)

The present invention relates to the collection of sap from trees such as maple trees, and, more particularly, to a system consisting of a network of tubing for receiving the sap from a group of trees and delivering the sap to a receptacle at a collection point.

The maple sugar industry for many years has prospered in spite of the crude and antiquated methods and equipment employed. It is thus apparent that this industry could greatly benefit by more modern methods and equipment, and, in so doing, a substantial savings in production costs and greater yields could be effected. The greatest need for such modernization appears to be in connection with the manner the sap is collected.

A recent survey of this industry indicated that, even in the most accessible maple orchards, sap collection is a time consuming drudgery which accounts for a major portion of the cost in the production of maple sugar. The tedious task of periodic tree-to-tree collection is a costly factor, which, due to increased labor costs, is today a consideration of great consequence.

Many years ago, equipment was devised for a tree-to-tree system wherein the sap dripped from conventional spouts into troughs connected in a network set on a grade by supports above the ground. The open troughs were exposed to foreign substances blown about by the wind which substances had to be removed before processing the sap. Also, the troughs were damaged by falling limbs and the traversing of deer and other animals through the woods. Such systems were unsuccessful.

It has also been proposed to cause the sap to flow into a network of piping set on a grade, but such systems, in addition to being subject to damage like the previously proposed system, often were damaged by heavy snow and sleet storms, were damaged by expansion of the sap in freezing, and took too long to thaw out after freezing. Also, after a freeze up, the new flow of sap would spill to the ground until the pipes thawed out.

More recently, it has been proposed to use a single pipe of large diameter having one end at a strategic location in the maple orchard formed with an opening into which the sap collected in the buckets was poured and allowed to flow by gravity to the collection point. While this procedure saved many steps from the trees to the collection point, a considerable labor cost was involved in the collection of the sap from the trees and the delivery thereof to the pipe.

Accordingly, an object of the present invention is to overcome the foregoing difficulties and disadvantages by providing a system whereby the sap is directly collected from the trees and delivered to the collection point by a closed network of tubing.

Another object is to provide such a system wherein the tubing can be laid on the ground and is not subject to damage like troughs or pipes supported above the ground.

Another object is to provide such a system which is not subject to damage by the expansion of the sap upon freezing.

Another object is to provide such a system which resists freezing and expedites thawing out.

Another object is to provide such a system which greatly increases the yield of sap from the trees over that obtained by collecting the sap in buckets in the conventional manner.

Another object is to provide such a system which can be readily assembled and set up, can be readily disassembled and stored away in a compact manner when not in use, and can be thoroughly cleaned internally to comply with the most stringent regulations governing cleanliness in handling products for human consumption.

A further object is to provide such a system which is not subject to corrosion or weather damage.

A still further object is to provide such a system which is simple in construction and economical to produce.

In accordance with the present invention, the foregoing objects generally are accomplished by providing a sap collecting system comprising tubing of a length to extend from a tree to a remotely located collection point, and fitting means attached to one end of the tubing in fluid tight connection and constructed and arranged for establishing a fluid tight sap tapping connection with a tap hole of a tree to enable sap to flow into the tubing directly from the tree, the other end of the tubing having an outlet for delivering the sap flowing through the tubing to sap collecting means, the tubing having a relatively thin wall and having a relatively small bore of much smaller area than the tap hole and of substantially uniform cross-sectional area throughout its length and dimensioned to be substantially filled with the sap flowing therethrough, the tubing being constructed of a flexible material capable of and by reason of its dimensions is dilatable in response to the hydraulic pressure exerted by the tree even at temperatures when the sap commences to freeze and when the sap commences to thaw.

A preferred embodiment of the invention has been chosen for purposes of illustration and description, and is shown in the accompanying drawing, forming a part of the specification, wherein.

Figures 1, 2, 3:
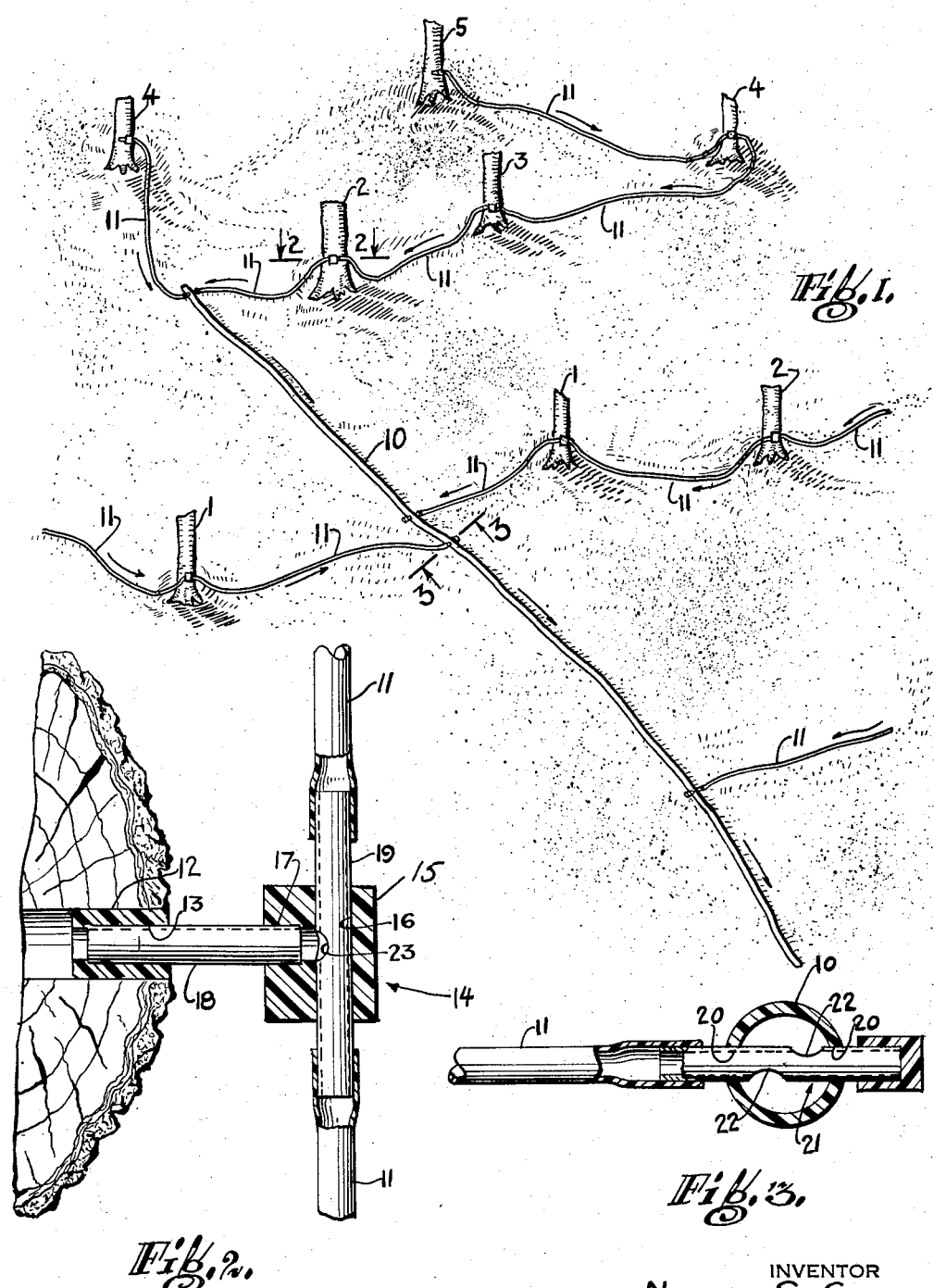
Fig. 1 is a schematic view illustrating the lower trunk portion of trees in a section of a maple orchard and the arterial network extending from tree-to-tree to the collection point in downgrade arrangement.
Fig. 2 is an enlarged sectional view of the tapping connection at a tree, taken substantially along the line 2—2 on Fig. 1.
Fig. 3 is an enlarged sectional view of the connection between the main line and a branch line, taken substantially along the line 3—3 on Fig. 1.

Referring to the drawing in detail and more particularly to Fig. 1, a section of a maple orchard is shown equipped with the sap collection system in accordance with one embodiment of the present invention which essentially comprises a main or trunk line 10 and branch lines 11 simply laid on the ground. Only the lower portion of the trees are shown which are growing on gently sloping terrain. The magnitude of the reference numerals 1 to 5 indicates the level of the taps of the trees relatively to each other, whereby the branch lines extend downgrade to the main line and the main line extends downgrade to the collection point (not shown).

As shown in Fig. 2, each tree is tapped and directly connected to a branch line 11 by means of an arrangement which comprises a centrally bored bushing 12 inserted into the tap hole of the tree, and a fitting 14 attached to the bushing. Preferably, the bushing is tapered or plug-like to facilitate its securement into the tap hole.

The fitting 14, as illustrated herein, comprises a body member 15 having a through bore 16 and a transverse bore 17 connected to the bore 16, a tubular section 18 having one end inserted into the bore 13 of the bushing and having its other end inserted into the bore 17 of the body member, and a tube 19 which extends through the bore 16 and has a side opening 23 in fluid flow communication with the bore of the tubular section 18. One of the ends of the tube 19 provides a tubular section for connecting an upstream portion of the branch line and the other end of this tube provides a tubular section for connecting a downstream portion of the branch line.

By utilizing a T-fitting of this type, a desired number of trees can be connected in a single branch line. At the tree furthest upstream in the branch line, a similar fitting can be used with the upstream tubular section thereof capped or otherwise sealed, or the fitting could be simplified by using only the tubing section 18 and directly connecting the upstream end of the branch line tubing to the outer end of the tubular section 18. It will also be appreciated that a cross-type fitting could be utilized having a section inserted into the bushing, two sections for tree-to-tree connection by a branch line, and a fourth section for direct connection to the main line by a branch line.

As shown in Fig. 3, the main line tubing 10 has a much greater internal cross-section area than the branch line tubing 11 and preferably the bore of the tubing is so dimensioned that it will not be filled with sap supplied by a large number of branch lines under normal operating conditions. This also facilitates connection of the branch lines thereto in a simple and convenient manner. Such a connection is established by forming the main line tubing with diametrically opposite side apertures 20, and inserting a tube 21 through these apertures which has opening means 22 within the main line tubing. A branch line can be attached to either or both of the ends of the tube, and in case only one end has a branch line connected thereto the other is capped or otherwise sealed as shown. Preferably, the opening means 22 comprise two holes at opposite sides of the tube 21 to assure gravity flow into the main line, regardless how the tube 21 is oriented within the apertures 20.

The tubular section 18, the tube 19 and the tube 21 are formed of aluminum or other metal which is unaffected by corrosion and is readily cleaned. The bushing 12, the body member 15 and the branch and main line tubing are formed of a somewhat yieldable synthetic plastic material, such as polyethylene or vinyl resin, which forms a fluid tight fit with the tubular metallic elements just referred to, whereby a closed arterial network is provided from the trees to the discharge end of the main line. A closed system has the advantage of appreciably curtailing bacterial slimes and preventing bacteria laden air from coming in contact with the sap.

It has been found that the system is less subject to freezing of the sap therein and thaws out quicker by constructing the synthetic plastic elements of a dark material of the type specified which has relatively high solar heat absorbing properties. To demonstrate this, several trees were double tapped and parallel lines of black and water white branch line tubing were each connected respectively to one set of taps. At near freezing temperatures, the black tubing allowed sap to flow after the sap had already frozen in the white tubing. After both lines had become severely frozen, the black tubing thawed-out and became operative much faster than the white tubing. Even when buried under a foot or more of snow, the black tubing functioned more consistently and temperature recordings indicated that the black tubing was absorbing heat. In these tests, the black and white tubing were subjected to identical conditions simultaneously for accurate comparison.

In a practical system, the results of which will be described hereinafter, the aluminum tube elements had an inner diameter of about 0.18 inch, the branch line tubing had an inner diameter of about 0.24 inch, the main line tubing had an inner diameter of about 0.625 inch, and the openings 22 had an effective diameter of 0.254 inch.

The main line tubing had a wall thickness of about 0.125 inch but this dimension is not too critical so long as the main line is sufficiently flexible to arrange the same as desired in the orchard and to enable the same to be coiled or reeled when placed in storage out of season. However, the greatest wall thickness within economic parameters assures the best fit for the tube 21, makes the tubing less subject to damage, and forms a more effective heat insulation to delay the freezing of the sap conveyed therein.

It has been discovered that the wall thickness of the branch line tubing plays an important part in the functioning of the system. Accordingly, this tubing has a wall thickness of about 0.050 and by being constructed of a relatively soft type of synthetic plastic the tubing wall is very flexible and dilatable. Thus, when sap freezes and expands, the tubing does not burst like metallic pipe but is enlarged to accommodate such expansion. The mechanical pressure of the tubing on the frozen sap due to its elastic nature urging it to return to its initial state, is believed to be at least partially converted to heat energy which somewhat increases the temperature of the sap and expedites the thawing thereof. Also, such mechanical pressure exerted on the thawing sap tends to squeeze it downstream for discharge into the main line. Also, a further and even more important advantage of the dilatable tubing is that it can be expanded under the hydraulic pressure exerted by the trees whereby warm sap can seep progressively along the inner walls of the tubing to thereby hasten thawing out of the system.

While it is not intended to limit the present invention to any particular theory, it is believed that some "beneficial" effect took place during the flow of the sap into the main line. This may be because the inner diameter of the tube 21 is somewhat smaller than the inner diameter of the branch line tubing which thereby provides a constriction just before the sap entered the main line tubing of much greater diameter. Thus, it is quite likely that the reduction enlargement in the path of sap flow produces a "Moody Draft Tube" effect which serves to reduce the pressure head at the tap to provide a greater pressure differential between the tree and the atmosphere whereby sap flows more readily from the tree. In the event the branch lines are filled with warm flowing sap, it is also likely that there is a syphoning effect which draws the sap out of the trees.

It also was observed that some aspirating effect took place at the fittings 14 by reason of the flow of sap through the tube 19 at a sufficient velocity to draw in sap through the side opening 23 from the tubular section 18.

In order to demonstrate the superiority of the system in accordance with the invention over the bucket collection system, fifty trees were connected by tubing to a sap collection point and were provided with a conventional tap and a collection bucket. Over a period of about five weeks, it was found that about 300 gallons of maple sap were collected by the tubing while only about 165 gallons were collected by means of the buckets. Not only does a system of tubing increase the yield of sap almost 80%, but it eliminates all the drudgery of manual collection.

At the end of these test runs, the elements of the system were undamaged and fully fit for further use. The system was dismantled and all the elements were washed by flushing with water under pressure containing a detergent. The branch and main line tubing arranged in coils and all fittings separated from the tubing were placed in boxes to thus provide for compact and convenient storage of the system.

The bushings 12 were permitted to remain in the tap holes, and were heat sealed to close off the bore thereof.

From the foregoing description, it will be seen that the present invention provides a simple and economical system for increasing the yield of maple sap collection with a minimum of manual supervision and labor. The system is readily assembled, maintained, taken down, cleaned and stored, and any damage thereto is easily repaired by replacing the damaged part.

While the present invention has been described in connection with the collection of maple sap, it will be appreciated that many features of the system can be advantageously employed in the collection of sap from other trees or vegetation capable of exerting hydraulic pressure.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Apparatus for collecting sap from a maple tree capable of exerting hydraulic pressure to cause its sap to flow therefrom which apparatus comprises tubing of a length to extend from a tree to a remotely located collection point, and fitting means attached to one end of said tubing in fluid tight connection and constructed and arranged for establishing a fluid tight sap tapping connection with a tap hole of a tree to enable sap to flow into said tubing directly from the tree, the other end of said tubing having an outlet for delivering the sap flowing through said tubing to sap collecting means, said tubing having a relatively thin wall and having a relatively small bore of much smaller area than the tap hole and of substantially uniform cross-sectional area throughout its length and dimensioned to be substantially filled with the sap flowing therethrough, said tubing being constructed of a flexible material capable of being and which by reason of its dimensions is dilated in response to the hydraulic pressure exerted by the tree even at temperatures when the sap commences to freeze and when the sap commences to thaw.

2. Apparatus according to claim 1, wherein said tubing includes a plurality of sections having adjacent ends and fitting means in sap tapping connection with another tree to interconnect said adjacent ends in fluid flow communication.

3. Apparatus according to claim 1, including sap collecting means in fluid flow communication with the outlet of said tubing.

4. Apparatus according to claim 1, comprising an arterial network of tubes including a main line for delivering sap to a collection point and branch lines of said tubing each in fluid tight connection with said main line for conducting sap into said main line.

5. Apparatus according to claim 4, wherein said main and branch lines are constructed of a material having relatively high solar heat absorbing properties.

6. A system according to claim 4, wherein said main line has a much greater internal cross-sectional area than said branch lines.

7. A system according to claim 6, wherein means provide a fluid flow connection between said branch lines and said main line having a smaller internal cross-sectional area than said branch line.

8. A system according to claim 7, wherein said main line has an aperture in the wall thereof, one end of a tube extends through said aperture in fluid tight connection, and the other end of said tube is inserted into a branch line in fluid tight connection, the bore area of the tube being smaller than the bore area of the branch line tubing.

9. A system according to claim 8, wherein said tube has an opening at opposite sides thereof for establishing fluid flow communication with its bore and said main line bore.

10. A system according to claim 6, wherein said main line has diametrically opposite apertures, and a tube extends through said apertures with its ends disposed externally of said main line and adapted for connection of a branch line thereto, said tube having a side opening for establishing fluid flow communication with its bore and said main line bore.

11. A system according to claim 10, wherein a branch line is connected to one end of said tube and a cap seals the other end of said tube.

12. A system according to claim 10, wherein said tube has an opening at opposite sides thereof.

References Cited in the file of this patent

UNITED STATES PATENTS

| | | |
|---|---|---|
| 1,186,741 | Brower | June 13, 1916 |
| 1,221,509 | Chesley | Apr. 3, 1917 |
| 1,682,760 | Laffin | Sept. 4, 1928 |
| 2,548,788 | Helme | Apr. 10, 1951 |
| 2,811,982 | De Young | Nov. 5, 1957 |

FOREIGN PATENTS

| | | |
|---|---|---|
| 22,632 | Great Britain | Sept. 30, 1910 |
| 457,083 | Great Britain | Nov. 20, 1936 |

OTHER REFERENCES

Petroleum Engineering, October 1940, page 168, article "Synthetic Tubing."

Chemical and Engineering News, vol. 30. January–March 1952, article "Trends in Industrial Piping," pages 316–321.

Farmer and Stock Breeder, vol. 69, No. 3408, 15–16, February 1955, article "Piping in the Plastic Age," pages 71 and 73.